June 20, 1933.  J. HUME  1,914,602
FLUID CONTROL DEVICE
Filed Dec. 15, 1928
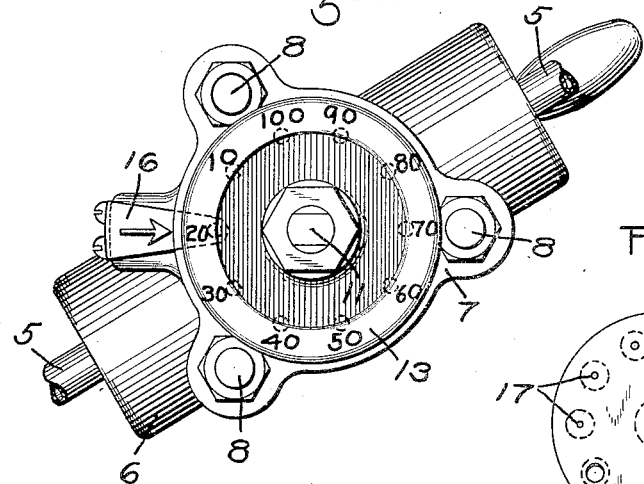
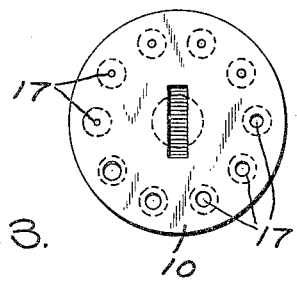
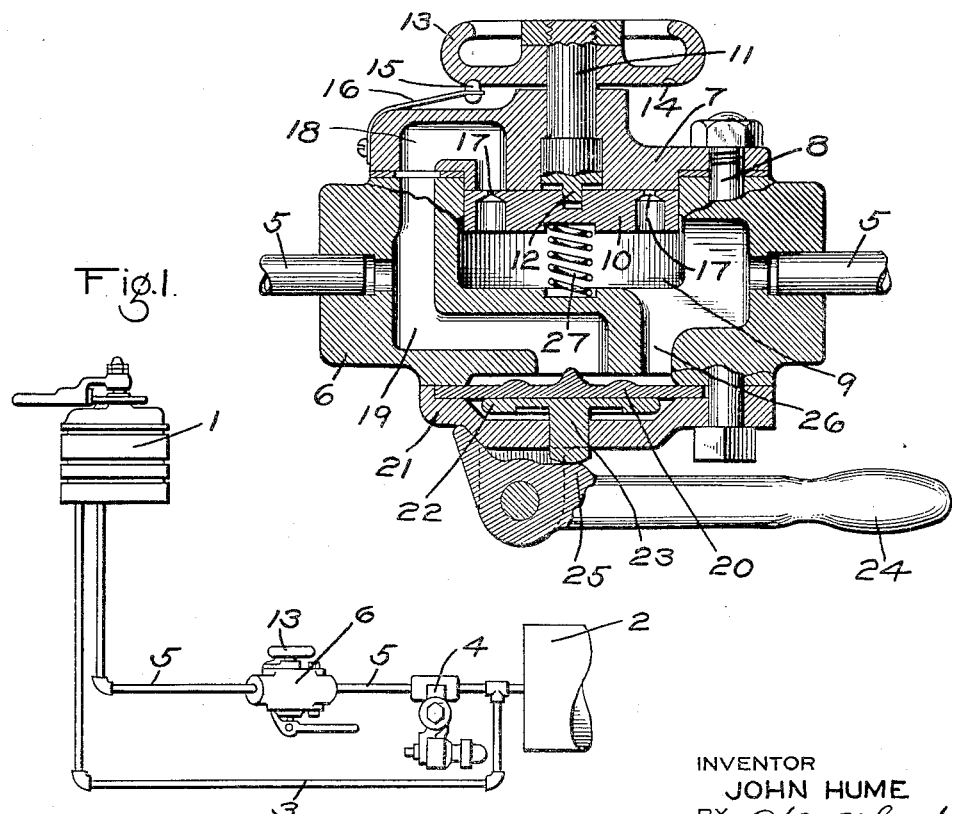
INVENTOR
JOHN HUME
BY Wm. N. Cady
ATTORNEY Patented June 20, 1933

1,914,602

UNITED STATES PATENT OFFICE

JOHN HUME, OF HOUSTON, TEXAS, ASSIGNOR TO THE WESTINGHOUSE AIR BRAKE COMPANY, OF WILMERDING, PENNSYLVANIA, A CORPORATION OF PENNSYLVANIA

FLUID CONTROL DEVICE

Application filed December 15, 1928. Serial No. 326,305.

This invention relates to testing devices and more particularly to means for testing the extent of leakage of fluid under pressure from the brake pipe of a fluid pressure brake system.

It is highly desirable to determine the extent of leakage of fluid under pressure from the brake pipe of a train equipped with a fluid pressure brake system and it has heretofore been proposed to provide a device which may be applied when the train is at a terminal or in a yard and the rate of brake pipe leakage determined. If the leakage exceeds a predetermined rate, the train is then inspected and the excessive leakage corrected.

The principal object of my invention is to provide a device which is permanently associated with the brake equipment and is located in the locomotive cab, so that the engineer may test the brake pipe leakage at any desired time, such as on an incoming train, so that when the train arrives at a terminal or other stopping point, the leakage may be reported and excessive leakage eliminated, before the train starts out again. Thus considerable time is saved and the engineer is at all times in position to determine whether or not fluid under pressure is being wasted by excessive leakage from the brake pipe.

In the accompanying drawing; Fig. 1 is a diagrammatic view of a portion of a fluid pressure brake system located in the locomotive cab, showing my invention embodied therein; Fig. 2 is a plan view of the improved testing device; Fig. 3 a central sectional view of the testing device; and Fig. 4 a plan view of the rotary valve employed in the testing device.

The engine brake equipment shown in Fig. 1 of the drawing comprises the usual brake valve device 1, the usual main reservoir 2 connected by pipe 3 to the brake valve device, and the usual feed valve device 4, connected through pipe 5 to the brake valve device.

Interposed in pipe 5 is the testing device comprising a casing 6 having a cover plate 7, which is secured to the casing 6 by bolts 8. Contained in casing chamber 9 is a rotary valve 10 which is adapted to seat on a seat provided at the under face of the cover plate 7.

Extending through a central bore in the cover plate 7 is a stem 11 having a key portion 12 adapted to engage a corresponding slot in the valve 10. Secured to the outer end of the stem 11 is a hand wheel 13 for rotating the stem and the valve 10. The under face of the wheel 13 is provided with a series of depressions 14 arranged in a circle and corresponding with the different positions of the wheel and adapted to be engaged by a button 15 carried by a spring member 16, which is secured to the cover plate 7.

The rotary valve 10 is provided with a series of orifices 17 arranged in a circle and having different flow areas. The chamber 9 is connected to the feed valve side of pipe 5 and the orifices 17 are adapted to be brought into registry with a passage 18 as the rotary valve 10 is rotated.

Passage 18 in the cover plate connects with a passage 19 in the casing 6 which is connected with the brake valve side of pipe 5. Disposed adjacent to the under face of casing 6 is a flexible diaphragm 20, which is clamped in place by a cover plate 21. A follower plate 22 engages the under face of the diaphragm and is provided with a stem 23 which extends out through an opening in the cover plate 21.

A handle 24 is pivotally mounted at the under face of the cover plate 21 and is provided with a cam portion 25 which is adapted to engage the end of stem 23. Normally, with the handle 24 released, the diaphragm permits communication from passage 19 to a passage 26, leading to chamber 9, but when the handle 24 is raised, the diaphragm 20 is moved upwardly to a seat on the casing 6, so as to cut off communication from passage 26 to passage 19. A spring 27 urges valve 10 to its seat.

The orifices 17 are preferably of flow areas to correspond with different train lengths, such as from a 10 car train to a 100 car train, the numerals 10 to 100 being applied to the upper face of the wheel 13 as indicated in Fig. 2.

In the normal running of the train, the handle 24 remains released in the position shown in Fig. 3, and a free flow of fluid under pressure from the feed valve device 4 to the brake valve device 1 is provided by way of the passages 26 and 19, and if the brake valve device 1 be in its normal running position, the pipe 5 is connected to the usual brake pipe, so that the pressure in the brake pipe is maintained at the pressure for which the feed valve device may be adjusted.

If the engineer wishes to test the train for leakage from the brake pipe, he lifts the handle 24, so as to operate the diaphragm 20 to cut off communication from passage 26 to passage 19, so that fluid under pressure can only flow from the feed valve device to the brake valve device by way of the particular orifice 17 which may be in registry with passage 18.

The engineer now rotates the wheel 13 to such a position, that the brake pipe pressure is maintained at the predetermined pressure carried in the brake pipe. If, with the brake pipe pressure maintained at the predetermined pressure, as indicated by the usual gage now provided on locomotives to indicate the brake pipe pressure, the orifice 17 through which fluid under pressure is being supplied, be the one corresponding with the number of cars in the particular train or is one for a lesser number of cars, he will know that the brake pipe leakage is not excessive, but if the size of orifice required to maintain the brake pipe pressure at the predetermined pressure be that for a larger number of cars, he will know that the brake pipe leakage is excessive and consequently, when he arrives at a station or terminal, he can so advise the yard or car men and thus have the excessive leakage stopped by an examination of the train.

For example, suppose the engineer finds that the brake pipe pressure is maintained when the wheel 13 is set at 20, as shown in Fig. 2, if he has a 20 car train or a train with a greater number of cars, he will know that the brake pipe leakage does not exceed the predetermined limit, but if his train consists of only 10 cars at this settting, he will know that the brake pipe leakage is excessive.

While one illustrative embodiment of the invention has been described in detail, it is not my intention to limit its scope to that embodiment or otherwise than by the terms of the appended claim.

Having now described my invention, what I claim as new and desire to secure by Letters Patent, is:—

In a fluid pressure apparatus, the combination with a brake pipe, and a feed valve device for supplying fluid under pressure to the brake pipe, of a valve device having adjustable valve means for supplying fluid under pressure from the feed valve device at different predetermined rates and having a by-pass through which the flow of fluid under pressure from the feed valve device to the brake pipe is unrestricted, a diaphragm valve for controlling communication through said by-pass, and a handle for operating said diaphragm.

In testimony whereof I have hereunto set my hand, this 5th day of December, 1928.

JOHN HUME.